US010181134B2

(12) United States Patent
Glover et al.

(10) Patent No.: US 10,181,134 B2
(45) Date of Patent: Jan. 15, 2019

(54) INDICATING ADVERTISED STATES OF NATIVE APPLICATIONS IN APPLICATION LAUNCHER

(71) Applicant: Samsung Electronics Co., Ltd., Suwon-si, Gyeonggi-do (KR)

(72) Inventors: Eric J. Glover, Palo Alto, CA (US); Brent Harrison, Kent, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/880,555

(22) Filed: Oct. 12, 2015

(65) Prior Publication Data
US 2017/0103422 A1 Apr. 13, 2017

(51) Int. Cl.
*G06Q 30/00* (2012.01)
*G06Q 30/02* (2012.01)
(Continued)

(52) U.S. Cl.
CPC ....... *G06Q 30/0267* (2013.01); *G06F 3/0488* (2013.01); *G06F 3/04817* (2013.01); *G06F 17/30867* (2013.01); *H04M 1/72522* (2013.01); *H04M 1/72583* (2013.01); *G06F 3/04842* (2013.01); *H04M 2250/22* (2013.01)

(58) Field of Classification Search
CPC ............ H04M 1/72583; G06F 3/04817; G06F 3/0488
USPC ........... 705/14.64, 14.4, 14.49, 14.67, 14.72, 705/14.73
See application file for complete search history.

(56) References Cited

U.S. PATENT DOCUMENTS 5,717,923 A * 2/1998 Dedrick ............ G06F 17/30702
5,848,396 A * 12/1998 Gerace .................. G06Q 30/02
705/7.33
(Continued)

FOREIGN PATENT DOCUMENTS

KR 20130080716 A 7/2013
KR 20130115517 A 10/2013

OTHER PUBLICATIONS

David Jingjun Xu, et al., "Combining Empirical Experimentation and Modeling Techniques: A design research approach for personalized mobile advertising applications." ElSevier, 2007. (Year: 2007).*
(Continued)

*Primary Examiner* — Luis A Brown
(74) *Attorney, Agent, or Firm* — Jefferson IP Law, LLP

(57) ABSTRACT

A mobile computing device includes a computing processor that displays an indication in association with a native application icon to indicate that an advertised state of the native application can be accessed by pressing and holding the icon. The mobile computing device receives a user selection includes a press-and-hold of the native application icon. In response to the user selection, the mobile computing device displays a preview of the advertisement state adjacent to the icon. An application launcher is configured to launch the native application into the advertised state upon receiving a user selection that includes a press of the advertisement preview. The computing processor launches the native application into the advertised state via an access mechanism associated with the advertised state upon receiving a user selection of the advertisement preview.

21 Claims, 6 Drawing Sheets

(51) Int. Cl.
  *G06F 17/30* (2006.01)
  *H04M 1/725* (2006.01)
  *G06F 3/0481* (2013.01)
  *G06F 3/0488* (2013.01)
  *G06F 3/0484* (2013.01)

(56) References Cited

U.S. PATENT DOCUMENTS

| | | | | |
|---|---|---|---|---|
| 5,991,735 | A * | 11/1999 | Gerace | G06Q 30/02 705/7.29 |
| 7,853,700 | B2 * | 12/2010 | Lee | G06Q 30/02 705/7.29 |
| 7,962,604 | B1 * | 6/2011 | Morris | G06Q 30/02 705/14.4 |
| 8,321,534 | B1 * | 11/2012 | Roskind | H04N 21/25808 348/194 |
| 2001/0029525 | A1 * | 10/2001 | Lahr | G06F 17/30864 709/218 |
| 2002/0042738 | A1 * | 4/2002 | Srinivasan | G06Q 30/02 705/14.43 |
| 2003/0106022 | A1 * | 6/2003 | Goodacre | G06F 17/30905 715/226 |
| 2005/0096979 | A1 * | 5/2005 | Koningstein | G06Q 10/10 705/14.68 |
| 2005/0096980 | A1 * | 5/2005 | Koningstein | G06Q 30/00 705/14.41 |
| 2005/0235048 | A1 * | 10/2005 | Costa-Requena | H04L 29/06027 709/219 |
| 2006/0074769 | A1 * | 4/2006 | Looney | G06Q 30/02 705/14.66 |
| 2006/0149624 | A1 * | 7/2006 | Baluja | G06Q 30/0255 705/14.53 |
| 2006/0271438 | A1 * | 11/2006 | Shotland | G06Q 30/02 705/14.46 |
| 2007/0022442 | A1 * | 1/2007 | Gil | G06F 17/30905 725/62 |
| 2007/0300152 | A1 * | 12/2007 | Baugher | G06F 17/3089 715/210 |
| 2008/0092159 | A1 * | 4/2008 | Dmitriev | G06Q 30/0269 725/34 |
| 2010/0036717 | A1 * | 2/2010 | Trest | G06Q 30/0207 705/14.1 |
| 2010/0222040 | A1 * | 9/2010 | Bosan | G06Q 30/02 455/414.1 |
| 2011/0010245 | A1 | 1/2011 | Priebatsch et al. | |
| 2012/0278722 | A1 * | 11/2012 | Raleigh | H04L 12/14 715/735 |
| 2012/0289147 | A1 * | 11/2012 | Raleigh | H04L 67/2847 455/3.06 |
| 2013/0018731 | A1 * | 1/2013 | Morris | G06Q 30/02 705/14.66 |
| 2013/0054366 | A1 | 2/2013 | Roundtree et al. | |
| 2013/0311300 | A1 | 11/2013 | Scarborough | |
| 2013/0325633 | A1 | 12/2013 | McAfee et al. | |
| 2013/0337785 | A1 * | 12/2013 | Delug | H04W 4/60 455/414.1 |
| 2014/0250106 | A1 * | 9/2014 | Shapira | G06F 17/30864 707/722 |
| 2014/0282245 | A1 | 9/2014 | Scarborough | |
| 2014/0316890 | A1 * | 10/2014 | Kagan | G06Q 30/0256 705/14.54 |
| 2015/0095160 | A1 * | 4/2015 | Ma | G06Q 30/0267 705/14.64 |
| 2015/0134436 | A1 * | 5/2015 | Lambert | G06Q 30/00 705/14.26 |
| 2015/0170215 | A1 | 6/2015 | McConnell | |
| 2015/0193546 | A1 * | 7/2015 | Lipton | G06F 9/445 717/178 |
| 2015/0227633 | A1 * | 8/2015 | Shapira | G06F 17/30395 707/706 |
| 2015/0254367 | A1 * | 9/2015 | Kagan | G06F 3/0482 707/706 |
| 2015/0339716 | A1 | 11/2015 | Guevremont | |
| 2015/0350827 | A1 * | 12/2015 | Birch | H04W 8/04 455/456.1 |
| 2015/0371263 | A1 * | 12/2015 | Kagan | G06Q 30/0256 705/14.54 |
| 2016/0034957 | A1 * | 2/2016 | Kagan | G06Q 30/0256 705/14.54 |
| 2016/0063535 | A1 * | 3/2016 | Xu | G06Q 30/0241 705/14.4 |
| 2016/0085521 | A1 * | 3/2016 | Savliwala | G06F 17/30867 717/108 |
| 2016/0092919 | A1 * | 3/2016 | Coleman, Jr. | G06Q 30/0255 705/14.53 |
| 2016/0162555 | A1 * | 6/2016 | Shapira | G06F 17/30554 707/722 |
| 2016/0291914 | A1 | 10/2016 | Yu et al. | |
| 2016/0313893 | A1 * | 10/2016 | Xu | G06F 3/0481 |
| 2017/0053314 | A1 | 2/2017 | Glover et al. | |
| 2017/0103423 | A1 | 4/2017 | Glover et al. | |

OTHER PUBLICATIONS

Alok Tongaonkar, et al., "Understanding Mobile App Usage Patterns Using In-App Advertisements." International Conference on Passive and Active Network Measurement, pp. 63-72, 2013. (Year: 2013).*

International Search Report and Written Opinion for PCT Application No. PCT/IB2016/055015, dated Dec. 8, 2016, 13 pages.

* cited by examiner

INDICATING ADVERTISED STATES OF NATIVE APPLICATIONS IN APPLICATION LAUNCHER

TECHNICAL FIELD

This disclosure relates to indicating advertised states of native applications in an application launcher.

BACKGROUND

Mobile computing devices can install and execute software applications. Software applications that are installed on a mobile computing device are often referred to as native applications. While some native applications can be purchased from a digital application store, many native applications are free-of-charge. Software developers of free native applications often use advertisements to generate revenues. A common practice of displaying advertisements is to display banner advertisements within the native application.

SUMMARY

One aspect of the disclosure provides a mobile computing device that includes a transceiver, a touchscreen display, a non-transitory memory and a computing processor. The memory stores at least one native application that is installed on the mobile computing device. The memory also stores an application launcher that launches the native application. The computing processor executes computer-readable instructions that, when executed by the computing processor, cause the computing processor to display an icon corresponding with the native application via the application launcher. The mobile computing device receives an advertisement object that includes information regarding an advertised state of the native application. The information may include access mechanism that can be invoked to access the advertised state. The computing processor can modify the icon to indicate the availability of the advertised state. The application launcher can launch the native application into the advertised state upon detecting a user selection of the icon.

In some implementations, the mobile computing device transmits an advertisement request and receives the advertisement object in response to transmitting the advertisement request. In some implementations, the application launcher can generate (e.g., instantiate) and display an additional icon for the advertised state. For example, the application launcher can display a default icon for the default state of the application and an advertisement icon for the advertised state of the application. In some implementations, the mobile computing device includes a sensor and the advertisement request may include sensor measurements. In some implementations, the application launcher launches the application into the advertised state upon detecting a short press of the icon and the default state upon detecting a long press of the icon. Short press refers to a user selection that lasts less than a threshold time period. Long press refers to a user selection that lasts longer than the threshold time period.

Another aspect of the disclosure provides a mobile computing device that includes a transceiver, a touchscreen display, a sensor, a memory and a computing processor. The memory stores a native application installed on the mobile computing device and an application launcher that launches the native application. The computing processor executes computer-readable instructions that, when executed by the computing processor, cause the computing processor to display an icon corresponding with the native application via the application launcher. The application launcher is configured to launch the native application into a default state upon receiving a first user selection that includes a press of the icon. The mobile computing device transmits an advertisement request via the transceiver. The advertisement request includes an application identifier (ID) that identifies the native application.

The mobile computing device receives an advertisement object in response to transmitting the advertisement request. The advertisement object includes an advertisement that corresponds with an advertised state of the native application. The advertisement includes an access mechanism to access the advertised state. The mobile computing device displays an indication in association with the icon. The indication indicates that the advertised state of the native application can be accessed by pressing and holding the icon. The mobile computing device receives a second user selection including a press-and-hold of the icon. In response to the second user selection, the mobile computing device displays the advertisement adjacent to the icon. The application launcher is configured to launch the native application into the advertised state upon receiving a third user selection that includes a press of the advertisement. The mobile computing device launches the native application into the advertised state via the access mechanism upon receiving the third user selection.

Another aspect of the disclosure provides a mobile computing device that includes a transceiver, a touchscreen display, a memory and a computing processor. The memory stores a native application installed on the mobile computing device and an application launcher that launches the native application. The computing processor executes computer-readable instructions that, when executed by the computing processor, cause the computing processor to display a first application icon corresponding with a default state of the native application. The application launcher is configured to launch the native application into the default state upon receiving a user selection of the first application icon. The mobile computing device transmits an advertisement request via the transceiver. The advertisement request includes an application identifier (ID) that identifies the native application. The mobile computing device receives an advertisement object in response to transmitting the advertisement request. The advertisement object includes an advertisement that corresponds with an advertised state of the native application. The advertisement may include an access mechanism to access the advertised state.

The mobile computing device replaces the first application icon with a folder icon corresponding with a folder. The folder includes the first application icon and a second application icon. The second application icon corresponds with the advertised state of the native application and the application launcher is configured to launch the native application into the advertised state upon receiving a user selection of the second application icon. The mobile computing device displays the first application icon and the second application icon in a window corresponding with the folder upon receiving a user selection of the folder icon. The mobile computing device launches the native application into the advertised state upon receiving a user selection of the second application icon.

Another aspect of the disclosure provides a computer-implemented method for launching a native application at a mobile computing device. The computer-implemented method includes displaying, at a touchscreen display of the mobile computing device, an icon corresponding with the native application via an application launcher being executed by a computing processor of the mobile computing device. The application launcher is configured to launch the native application into a default state upon receiving a first user selection that includes a press of the icon. The method includes transmitting an advertisement request via a transceiver of the mobile computing device. The advertisement request includes an application identifier (ID) that identifies the native application. The method includes receiving, via the transceiver, an advertisement object in response to transmitting the advertisement request. The advertisement object includes an advertisement that corresponds with an advertised state of the native application. The advertisement may include an access mechanism to access the advertised state.

The method further includes displaying an indication in association with the icon. The indication indicates that the advertised state of the native application can be accessed by pressing and holding the icon. The method includes receiving a second user selection via the touchscreen display. The second user selection includes a press-and-hold of the icon. In response to the second user selection, the method includes displaying the advertisement adjacent to the icon. The application launcher is configured to launch the native application into the advertised state upon receiving a third user selection that includes a press of the advertisement. The method includes launching, by the computing processor, the native application into the advertised state via the access mechanism upon receiving the third user selection.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 2A:
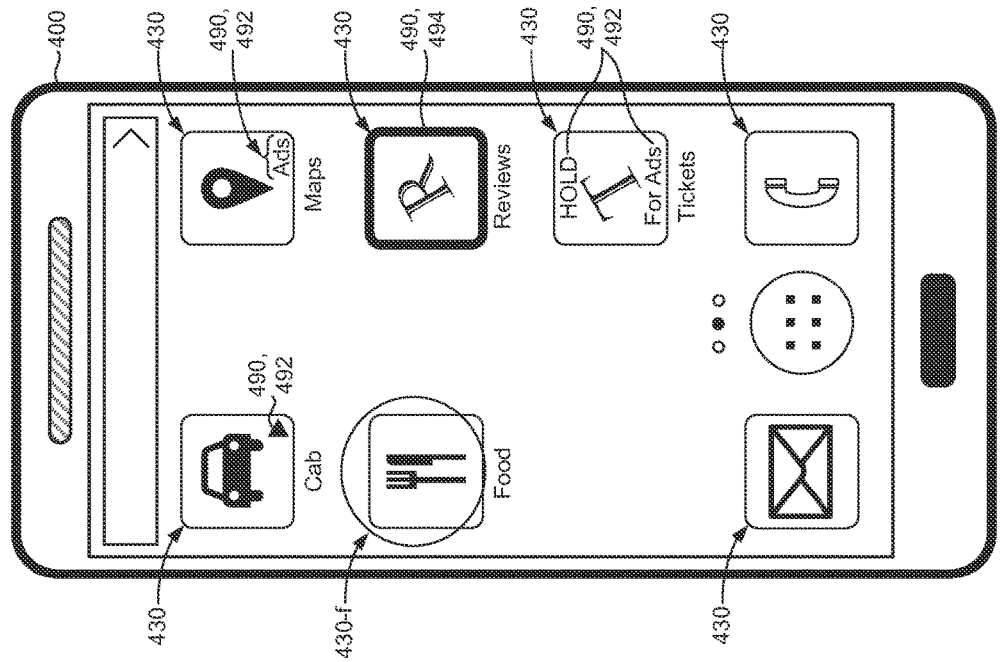
FIG. 2A is a diagram illustrating an example mobile computing device that indicates the availability of advertised states by displaying an indication in association with a default state icon or by replacing the default state icon with a folder icon.

Mobile computing devices can install and execute native applications. While some native applications have a price, many native applications can be downloaded free-of-charge. Many free native applications display advertisements to generate revenues. Some users appreciate advertisements because the advertisements often relate to relevant products and the services. But to view and act upon an advertisement, the user has to launch the native application. Hence, if a native application is not launched, neither the user nor the application developer benefit from the native application's ability to display banner advertisements.

The present disclosure provides a mobile computing device that includes native applications and an application launcher. An application launcher may include a set of computer-readable instructions that are executed by the mobile computing device to launch the native applications. The application launcher may be included in an operating system of the mobile computing device. Alternatively, the application launcher may be provided by a third-party developer and can be installed by the user of the mobile computing device. In other words, the application launcher may itself be a native application. Launching a native application may refer to retrieving computer-readable instructions corresponding with the native application from a memory of the mobile computing device and executing the computer-readable instructions at a computing processor.

Native applications often include numerous states. Different states of a native application may correspond with different entities. For example, a reviews application that displays crowd-sourced reviews may include a first state that displays a review of a pizza store and a second state that displays a review of a café. Most native applications designate one of their states as a default state that is presented when the native application is launched. The default state of an application may be referred to as a "home state". Certain states of a native application may be referred to as advertised states, for example, because they correspond with an advertising campaign. The application launcher displays application icons for the native applications on a home screen. An application icon can be selected by a user to launch the native application into the default state. Application icons that cause the native application to launch in their default state may be referred to as default state icons. Similarly, application icons that cause the native application to launch into their advertised states may be referred to as advertised state icons.

The application launcher can indicate the availability of an advertised state of a native application by displaying an indication in association with the default state icon. The indication may be a symbol that is overlaid on the default state icon. For example, the indication may be an object (e.g., a small triangle), an image or text (e.g., "Ads" or "HOLD for Ads"). The user can press-and-hold the default state icon to view a preview of the advertised state and to launch the native application directly into the advertised state. For example, when the user presses-and-holds the default state icon, the application launcher can display the advertised state icon adjacent to the default state icon. The user can press the advertised state icon to launch the native application directly into the advertised state. Instead of displaying the advertised state icon, the application launcher can display a preview of the advertised state and the user can press the preview to launch the native application into the advertised state. In this way, the application launcher can dynamically increase the amount of information that is presented to the user given the limited real estate on the screen of the mobile computing device when there is additional information to display (e.g., advertised state icons).

As an alternative to modifying the default state icon, the application launcher can replace the default state icon with a folder icon that corresponds with a folder. The application launcher can create (e.g., generate) the folder and place the default state icon and the advertised state icon in the folder. When the user presses the folder icon, the application launcher displays the default state icon and the advertised state icon in a window. The user can select either the default state icon or the advertised state icon to launch the native application into the default state or the advertised state, respectively. In this way, the application launcher can dynamically increase the amount of information that is presented to the user given the limited real estate on the screen of the mobile computing device when there is additional information to display (e.g., advertised state icons).

Figure 1:
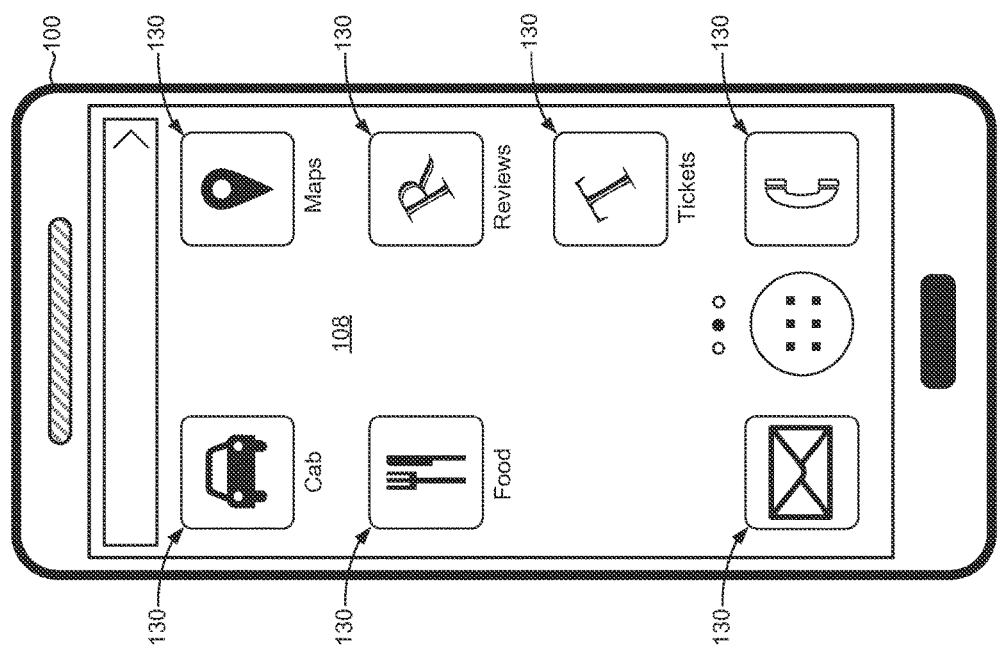
FIG. 1 is a diagram illustrating a conventional home screen of a mobile computing device.

FIG. 1 illustrates a mobile computing device 100 that includes various native applications (not shown) and an application launcher (not shown) that can be used to launch the native applications. The application launcher can display a home screen 108 that includes default state icons 130 corresponding with default states of the native applications. The application launcher can detect a user input (e.g., a press) of a default state icon 130 and launch the corresponding native application into its default state.

FIG. 2A illustrates a mobile computing device 400 that can execute various native applications (not shown) and an application launcher (not shown) that can be used to launch the native applications. The application launcher can indicate the availability of advertised states for a native application by displaying an indication 490 in association with the default state icon 430 for the native application. The indication 490 may include a symbol 492 that the application launcher overlays on the default state icon 430. The symbol 492 may be an object (e.g., a circle, a square, a triangle or other geometric figure). Alternatively, the symbol 492 may include an image or a text string (e.g., "Ads", "HOLD for Ads"). The indication 490 may include a formatting style 494. The formatting style 494 may include visual characteristics that affect the visual appearance of the default state icons (e.g., size, font, color, refresh rate, etc.). For example, the application launcher may indicate the availability of advertised states for the native reviews application by placing a thick border around the default state icon 430 for the native reviews application.

As an alternative to using the symbol 492 or the formatting style 494, the application launcher can replace the default state icon 430 with a folder icon 430-f that corresponds with a folder. The application launcher can create (e.g., generate) the folder and the place (e.g., store) the default state icon 430 in the folder. In addition to placing the default state icon 430 in the folder, the application launcher can place an advertised state icon in the folder. Upon receiving a user selection of the folder icon 430-f, the application launcher can display the default state icon 430 and the advertised state icon. The user can launch the native application into either the default state or the advertised state by selecting the default state icon or the advertised state icon, respectively. In the example of FIG. 2A, the application launcher replaced the default state icon 430 for the native food application with the folder icon 430-f.

Figure 2C:
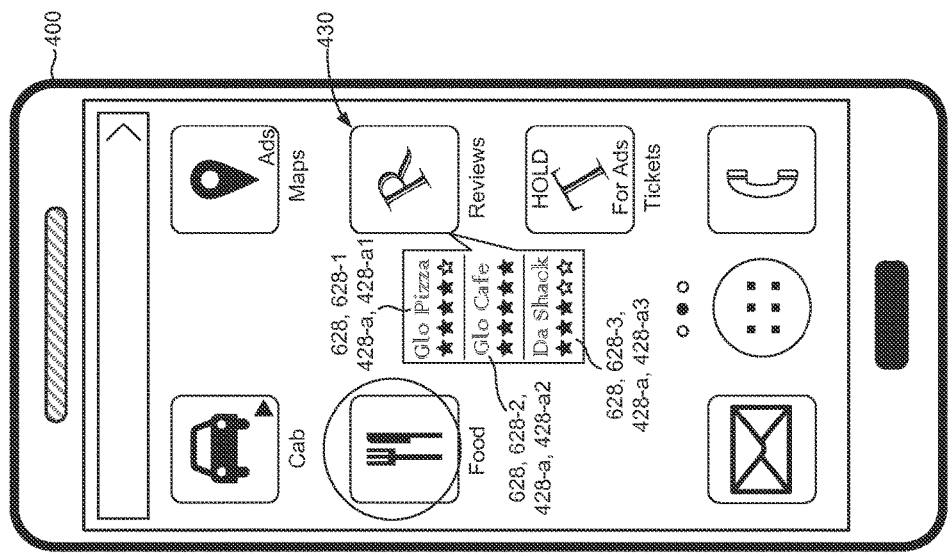
FIG. 2C is a diagram of the mobile computing device illustrating previews of the advertised states upon detecting a long press of the default state icon in FIG. 2A.
Figure 2B:
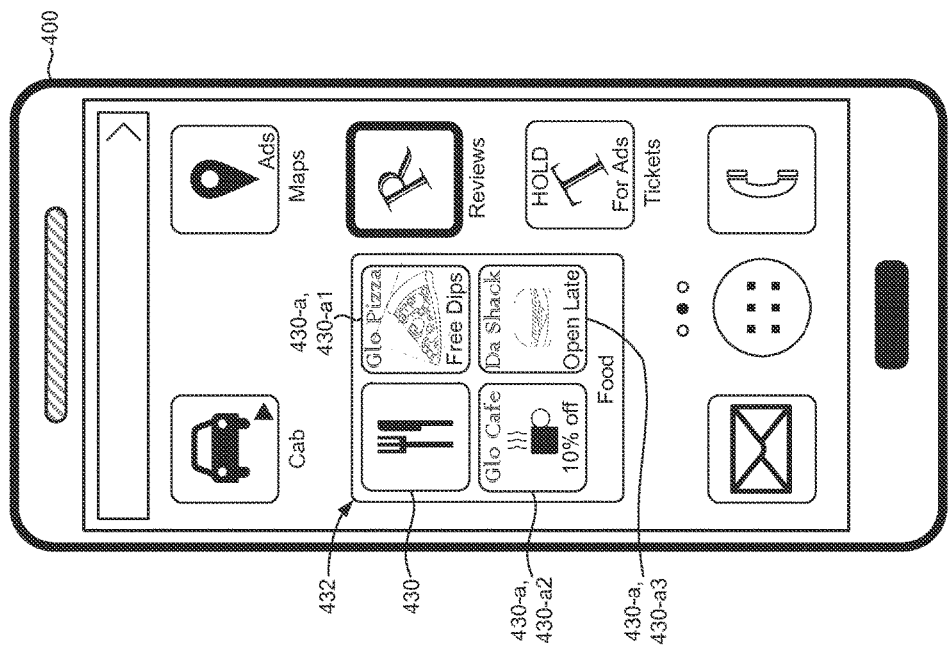
FIG. 2B is a diagram of the mobile computing device illustrating the contents of a folder upon detecting a press of the folder icon in FIG. 2A.

FIG. 2B illustrates a window 432 that the application launcher displays upon receiving a user selection (e.g., press) of the folder icon 430-f shown in FIG. 2A. The window 432 displays the contents of the folder corresponding with the folder icon 430-f. The window 432 includes the default state icon 430 and advertised state icons 430-a. In the example of FIG. 2B, the advertised state icons 430-a correspond with advertised states of a native food ordering application. Upon receiving a user selection of any one of the advertised state icons 430-a, the application launcher launches the native food ordering application into the advertised state corresponding with the selected advertised state icon 430-a. For example, the advertised state icon 430-a1 corresponds with a state of the native food application that relates to Glo Pizza (a fictitious pizza store). Upon receiving a user selection of the advertised state icon 430-a1, the application launcher launches the native food application into the state corresponding with Glo Pizza. Similarly, the advertised state icons 430-a2, 430-a3 are linked to states corresponding with Glo Café (a fictitious café) and Da Shack (a fictitious burger store). Advantageously, the window 432 enables the user to launch the native food application into either the default state by pressing the default state icon 430 or into one of the advertised states by pressing an advertised state icon 430-a FIG. 2C illustrates an example screen that the application launcher displays upon detecting a press-and-hold (e.g., a long press) of the default state icon 430 for the native reviews application. Upon detecting a press-and-hold of the default state icon 430, the application launcher can display previews 628 for the advertised states of the native application. The previews 628 may be referred to as ad previews 628. The previews 628 may include some information from the advertised states. For example, the preview 628-1 for Glo Pizza includes a rating for Glo Pizza. Similarly, the previews 628-2, 628-3 include ratings for Glo Café and Da Shack, respectively.

The previews 628 can be linked with state access mechanisms 428-a, so that when a preview 628 is pressed the application launcher launches the native application into the advertised state. For example, upon detecting a press of the preview 628-1 for Glo Pizza, the application launcher can use the state access mechanism 428-a1 to launch the native reviews application into the state corresponding with Glo Pizza. Similarly, the application launcher can use the state access mechanisms 428-a2, 428-a3 to launch the native reviews application into the states corresponding with Glo Café and Da Shack, respectively.

The application launcher may receive the previews 628 and the state access mechanisms 428-a for the advertised states with the advertisements from a server (e.g., an advertisement server). Alternatively, the application launcher may receive the advertisements from the server and the application launcher may determine the previews 628 by making an application programming interface (API) call to the native reviews application or a server (e.g., an application server or a web server).

Figure 3:
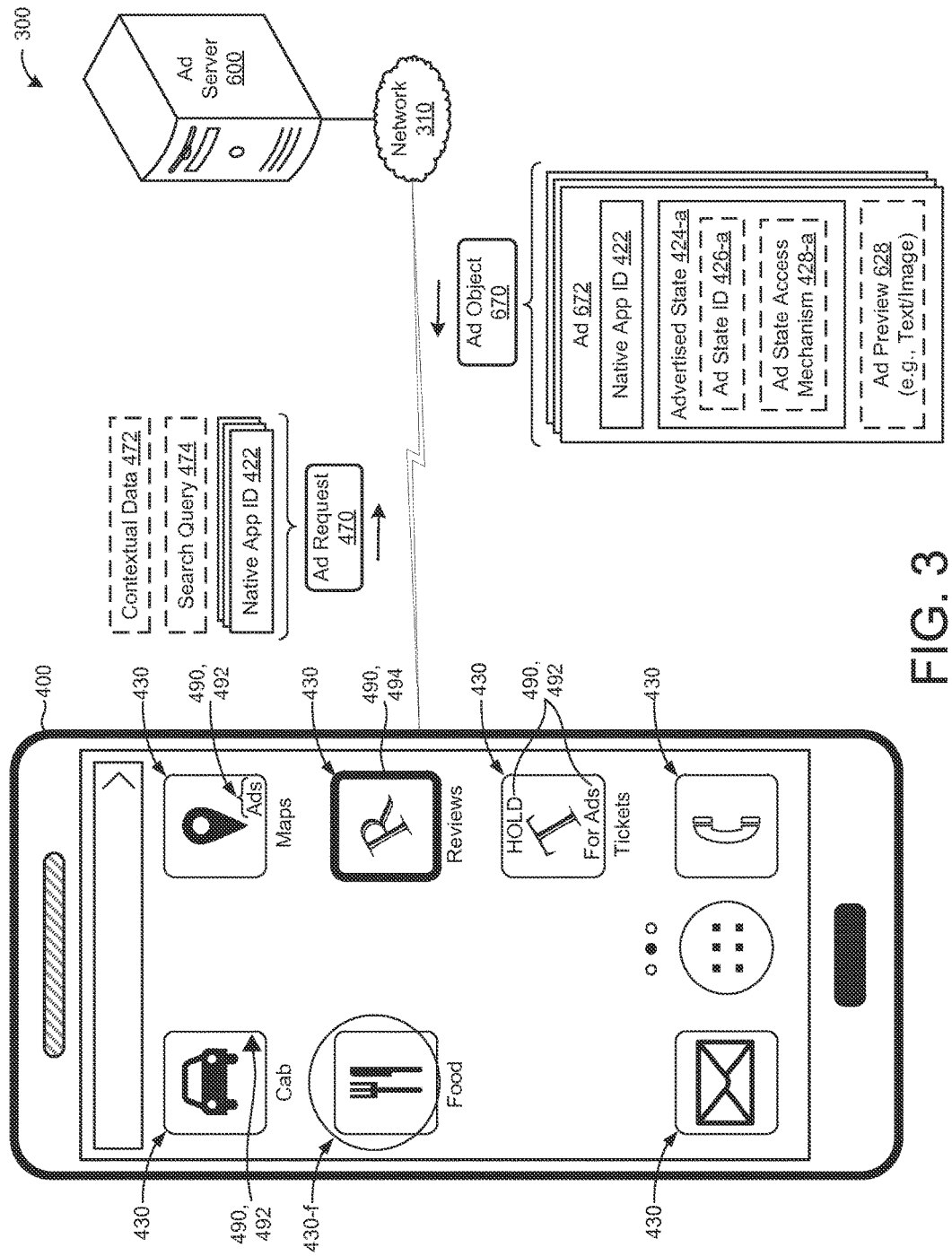
FIG. 3 is a schematic diagram of an example system that may be used to indicate the advertised states of native applications in the application launcher.

FIG. 3 illustrates an example system 300 that visually indicates the availability of advertised states via an application launcher of a mobile computing device 400. The system 300 includes the mobile computing device 400 (e.g., client computing device) and an advertisement (ad) server 600. The system 300 may include a network 310 that enables electronic communication between the mobile computing device 400 and the advertisement server 600. The network 310 may include a wireless network (e.g., a cellular network) and/or a wired network (e.g., Ethernet).

In operation, the mobile computing device 400 transmits an ad request 470 to the server 600. The ad request 470 includes application identifiers (IDs) 422 that identify native applications installed at the mobile computing device 400. The application IDs 422 can be transmitted either in a raw format (e.g. a list of application IDs) or in a concealed format to better protect the user's privacy. In the latter implementations, the application IDs may be hashed and/or encoded in a Bloom filter. In response to transmitting the ad request 470, the mobile computing device 400 receives an ad object 670 from the ad server 600. The ad object 670 includes ads 672 that correspond with advertised states of one or more of the native applications installed at the mobile computing device 400. An ad 672 may refer to information regarding a particular state that is being promoted or advertised. An ad 672 indicates its corresponding native application by indicating the application ID 422 of the native application. The mobile computing device 400 can indicate the availability of the ads 672 by displaying the indication 490. Alternatively, the mobile computing device 400 can indicate the availability of the ads 672 by replacing the default state icon 430 with a folder icon 430-f and placing the default state icon 430 along with the advertised state icon(s) 430-a (see FIGS. 2B and 4) in the folder.

The ad request 470 may include contextual data 472 in addition to the application IDs 422. The contextual data 472 indicates a context of the mobile computing device 400. The contextual data 472 may include sensor measurements taken by one or more sensors of the mobile computing device 400. Example sensor measurements include a location of the mobile computing device 400, an accelerometer reading, a magnetometer reading, a gyroscope reading, device temperature, ambient temperature, ambient lighting level, etc. The contextual data 472 may also indicate information that is currently being displayed by the mobile computing device 400 (e.g., onscreen information). The contextual data 472 may indicate which of the native applications are currently being executed (e.g., active applications). In addition to the application IDs 422, the ad request 470 may include a search query 474. The search query 474 may include one or more search terms.

The ads 672 can indicate an advertised state 424-a of a native application by including a state ID 426-a that identifies the advertised state 424-a. Alternatively, the ads 672 can indicate the advertised state 424-a by including a state access mechanism 428-a that may be used to access the advertised state 424-a. The state access mechanism 428-a may be a uniform resource locator (URL) that directly points to the advertised state 424-a. Alternatively, the state access mechanism 428-a may be a script that can be used to redirect the native application from the default state 424-d (see FIG. 4) to the advertised state 424-a. The ads 672 may include ad previews 628 that can be displayed by the mobile computing device 400 in the application launcher. The ad preview 628 may include text and/or images. The ad preview 628 may include information from the advertised state 424-a. For example, the ad preview 628 for an advertised state 424-a that displays a restaurant review may include a rating of the restaurant.

Figure 4:
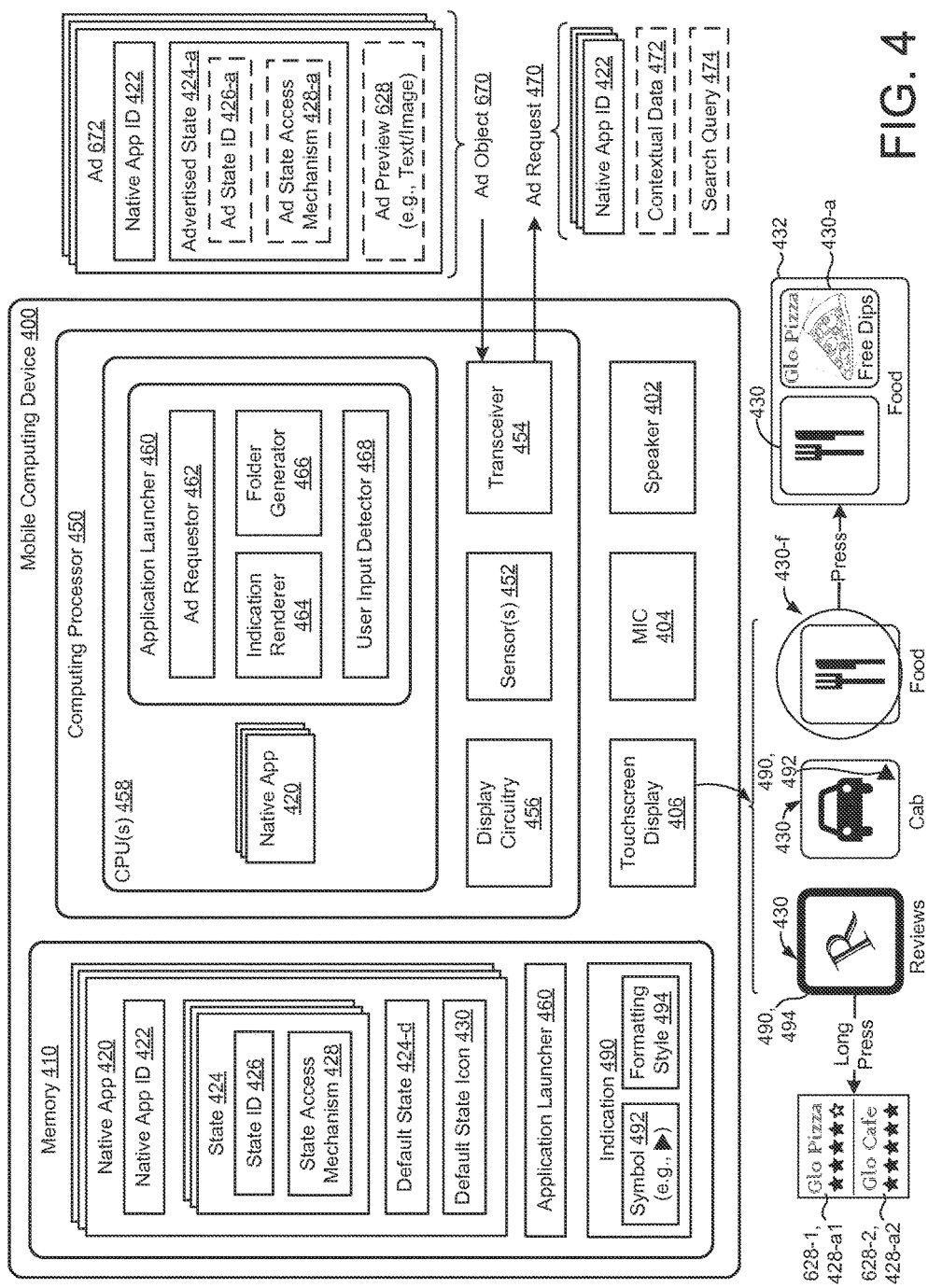
FIG. 4 is an example block diagram of the mobile computing device.

FIG. 4 illustrates an example block diagram of the mobile computing device 400. The mobile computing device 400 includes a speaker 402, a microphone 404, a touchscreen display 406, a memory 410 and a computing processor 450. The touchscreen display 406 may include a capacitive touchscreen or a resistive touchscreen. The touchscreen display 406 may include a Liquid Crystal Display (LCD), a Light Emitting Diode (LED) display, an Organic Light Emitting Diode (OLED) display or any other suitable display type.

The memory 410 stores data. The memory 410 may include one or more computer readable storage mediums. For example, the memory 410 may include solid state memory devices, hard disk memory devices, optical disk drives, read-only memory and/or nanotube-based storage devices. The memory 410 may be connected to the computing processor 450 via a bus and/or a network. The memory 410 stores native applications 420 that are installed on the mobile computing device 400.

A native application 420 may include a native application ID 422 (application ID 422, hereinafter) that identifies the native application 420. A native application 420 may include various application states 424 (states 424, hereinafter). The native application 420 may identify one of the states 424 as a default state 424-d that is presented (e.g., displayed) when the native application 420 is launched. Each state 424 may correspond with a different entity and display information related to the entity. For example, a particular state, within a native review application, may correspond with a pizza store entity and may display crowd-sourced reviews of the pizza store. The states 424 can be identified by state IDs 426. The states 424 may be accessed via state access mechanisms 428. The state access mechanisms 428 may be URLs that point to their respective states 424. Alternatively, the state access mechanisms 428 may include scripts (e.g., macros) that redirect the native application 420 from the default state 424-d to the desired state 424. A native application 420 may specify a default state icon 430 that can be used to launch the native application 420 into its default state 424-d.

The memory 410 also stores an application launcher 460. The application launcher 460 launches the native applications 420. The application launcher 460 may be a native application 420. Alternatively, the application launcher 460 may be an operating system or a part thereof. The application launcher 460 displays the default state icons 430 for the native applications 420. Upon receiving a user selection of a default state icon 430, the application launcher 460 launches the native application 420 into the default state 424-d.

The memory 410 may store a symbol 492 that can be used by the application launcher 460 to indicate the availability of advertised states 424-a. The symbol 492 may be a universal symbol that is used for all native applications 420. Alternatively, the symbol 492 may be different for different native applications 420. The symbol 492 may be an object (e.g., a circle, a triangle, a square or any other polygon). The symbol 492 may be an image or text (e.g., "Ads", "HOLD for Ads", etc.).

In addition to storing the symbol 492 or as an alternative to storing the symbol 492, the memory 410 may store a formatting style 494. The formatting style 494 may specify one or more visual characteristics that are applicable to the default state icons 430. For example, the formatting style 494 may specify a border thickness, a font for the icon caption (e.g., font color, font size or font style), an icon size, a refresh rate for the icon, etc. The application launcher 460 can apply the formatting style 494 to a default state icon 430 to indicate the availability of an advertised state 424-a in the native application 420.

The computing processor 450 may include one or more sensors 452, a transceiver 454, display circuitry 456 and one or more CPUs 458. Referring to the sensors 452, example sensors 452 include a location sensor that determines a location of the mobile computing device 400. The location sensor may use Global Positioning System (GPS) and/or Global Navigation Satellite System (GLONASS). The sensors 452 may include an accelerometer, a magnetometer, a gyroscope, a thermometer, a fingerprint reader, etc. The sensors 452 capture sensor measurements. The sensors 452 may capture the sensor measurements periodically and/or in response to a request. The computing processor 450 may store the sensor measurements captured by the sensors 452 in the memory 410. The computing processor 450 may retrieve the stored sensor measurements from the memory 410 and use the retrieved sensor measurements at a later time. For example, the computing processor 450 may include the sensor measurements in the ad request 470.

The display circuitry 456 causes the touchscreen display 406 to display information. The display circuitry 456 may receive user input (e.g., user selections) from the touchscreen display 406. The display circuitry 456 may include a display driver. The display driver may drive the touchscreen display 406. For example, the display circuitry 456 may include a Light Emitting Diode (LED) driver that may drive a LED display. The display circuitry 456 may drive a stereoscopic display (e.g., an autostereoscopic 3D display).

The transceiver 454 enables the mobile computing device 400 to electronically communicate with other devices (e.g., the ad server 600 in FIG. 3). The transceiver 454 may include a cellular transceiver, for example, a LTE transceiver, a LTE-Advanced transceiver, or a 5G ($5^{th}$ generation mobile network) transceiver. The transceiver 454 may include a Wireless Fidelity (Wi-Fi) transceiver. The transceiver 454 may include a ZigBee transceiver, a Bluetooth transceiver (e.g., Bluetooth Low Energy transceiver), a Near Field Communications (NFC) transceiver, etc. The transceiver 454 may include a wired transceiver that communicates via wired communications. For example, the transceiver 454 may communicate via an Ethernet cable, a USB cable, or the like.

The transceiver 454 may enable the mobile computing device 400 to communicate with electronic devices that are proximate to the mobile computing device 400. An electronic device may be referred to as being in proximity with the mobile computing device 400 when the mobile computing device 400 can communicated with the electronic device via short-range communications (e.g., Wi-Fi, NFC, Bluetooth, ZigBee, etc.). Alternatively or additionally, an electronic device may be referred to as being in proximity with the mobile computing device 400 when a distance between the mobile computing device 400 and the electronic device is less than a threshold distance (e.g., about 100 feet). Example electronic devices include appliances (e.g., refrigerator, stove, oven, microwave, coffee maker, toaster, etc.), home automation devices (e.g., thermostat, smoke detector, security system, etc.) and automobiles (e.g., cars, trucks, motorcycles, etc.). In some scenarios, the mobile computing device 400 may receive the ad object 670 via one of the electronic devices that are in proximity with the mobile computing device 400.

The CPU(s) 458 are capable of executing computer-readable instructions that cause the CPU(s) 458 to execute the native applications 420 and the application launcher 460. The CPU(s) 458 may be based on the reduced instruction set computing (RISC) architecture (e.g., an ARM processor). Alternatively, the CPU(s) 458 may be based on the complex instruction set computing (CISC) architecture (e.g., an x86 processor). The CPU(s) 458 may be based on other architectural models (e.g., quantum computing). The CPU(s) 458 may refer to a single CPU or to multiple CPUs (e.g., dual-core, quad-core or octa-core). The CPU(s) 458 may include general-purpose CPU(s) or special-purpose CPU(s), for example, Application Specific Integrated Circuit(s) (ASIC(s)). The CPU(s) 458 may execute the native applications 420 and the application launcher 460.

The application launcher 460 launches the native applications 420. The application launcher 460 launches a native application 420 in response to receiving a user selection to launch the native application 420 (e.g., upon receiving a press of a default state icon 430 corresponding with the native application 420). To launch a native application 420, the application launcher 460 may instruct a kernel of the operating system to start a process for the native application 420. To start the process, the kernel may allocate memory for bookkeeping and then load (e.g., retrieve) the computer-readable instructions corresponding with the native application 420.

The application launcher 460 may include an ad requestor 462 that requests the ads 672. The ad requestor 462 may request the ads 672 by generating the ad request 470 and transmitting the ad request 470 to an ad server via the transceiver 454. The ad requestor 462 may retrieve the application IDs 422 from the memory 410. The ad requestor 462 can generate the ad request 470 by creating a data container (e.g., a JSON file, XML file, etc.) that includes the application IDs 422. In addition to the application IDs 422, the ad request 470 may include contextual data 472. The ad requestor 462 may capture the contextual data 472 (e.g., by retrieving the contextual data 472 from the memory 410). Examples of the contextual data 472 include sensor measurements taken by the sensors 452, a search history and information displayed by the touchscreen display 406 (e.g., onscreen information).

In some implementations, the ad request 470 includes a search query 474. The ad request 470 may include the search query 474 in addition to the contextual data 472 or as an alternative to the contextual data 472. The application launcher 460 can display a search box that enables a user of the mobile computing device 400 to input the search query 474. The application launcher 460 receives the ad object 670 in response to transmitting the ad request 470. Alternatively, the application launcher 460 may receive the ad object 670 without sending the ad request 470.

The application launcher 460 may include an indication renderer 464 that renders an indication 490 to indicate the availability of the ads 672. The indication renderer 464 may render the indication 490 by overlaying a symbol 492 on the default state icon 430 of the native application 420 identified by the ad 672. For example, the indication renderer 464 can retrieve the symbol 492 from the memory 410 and overlay the symbol 492 on the default state icon(s) 430 of the native application(s) 420 identified by at least one of the application IDs 422 in the ads 672. The symbol 492 may be same for all native applications 420. Alternatively, the symbol 492 may be different for different native applications 420. If the memory 410 stores different symbols 492 for different native applications 420, then the indication renderer 464 retrieves the symbol 492 corresponding with the native application 420 identified by the ad 672. The indication renderer 464 may utilize an inverted index that indexes application IDs 422 to the symbols 492.

As an alternative to overlaying the symbol 492, the indication renderer 464 can render the indication 490 by applying a formatting style 494 to the default state icon(s) 430 of the native application(s) 420 identified by the ad(s) 672. The indication renderer 464 may retrieve the formatting style 494 from the memory 410. The formatting style 494 may specify multiple visual characteristics that can be applied to default state icons 430 (e.g., border thickness, font color, font size, icon size, etc.). The indication renderer 464 may apply all the visual characteristics specified in the formatting style 494 to the default state icon(s) 430. Alternatively, the indication renderer 464 may select certain visual characteristics from the formatting style 494 and apply the selected visual characteristics to a default state icon 430. The formatting style 494 may include different formatting styles 494 for different native applications 420. The indication renderer 464 may utilize an inverted index that indexes the application IDs 422 to the formatting styles 494.

The application launcher 460 may include a folder generator 466. The folder generator 466 generates a folder (not shown) and a folder icon 430-*f* that can be selected (e.g., pressed) to open a window 432 that displays the contents of the folder. The folder generator 466 replaces the default state icon 430 for the native application 420 identified in the ad 672 with the folder icon 430-*f*. The folder generator 466 places (e.g., stores) the default state icon 430 in the folder. The folder generator 466 generates advertised state icon(s) 430-*a* that can be used to access the advertised state(s) 424-*a* and places (e.g., displays) the advertised state icon(s) 430-*a* in the folder along with the default state icon 430. The advertised state icon(s) 430-*a* use the state access mechanism(s) 428-*a* included in the ads 672 to launch the native application 420 directly into the advertised state 424-*a*.

The application launcher 460 may include a user input detector 468 that detects user inputs (e.g., user selections of icons). The user input detector 468 can distinguish between two types of user inputs: a press and a press-and-hold. A press may refer to a user input in which a physical object makes contact with the touchscreen display 406 for a time duration that is less than a threshold amount of time (e.g., less than 500 ms). A press-and-hold may refer to a user input in which the physical object makes contact with the touchscreen display 406 for a time duration that is longer than the threshold amount of time (e.g., longer than 500 ms). The press-and-hold user input may be alternatively referred to as a "long press". The physical object could be any one of the user's fingers, a stylus, a pen or any other physical object that can be used to interact with the touchscreen display 406.

When the user input detector 468 detects a press (e.g., a short press or long press) of a default state icon 430 that is associated with the indication 490, the application launcher 460 can display the state access mechanism 428-*a* for the advertised state 424-*a*. The state access mechanism 428-*a* may be displayed adjacent to the default state icon 430. The displayed state access mechanism 428-*a* may be user selectable, so that a user can select the state access mechanism 428-*a* to launch the native application 420 directly into the advertised state 424-*a*. As an alternative to displaying the state access mechanism 428-*a*, the application launcher 460 can display the ad preview 628 adjacent to the default state icon 430. The ad preview 628 may be linked to the state access mechanism 428, so that pressing the ad preview 628 launches the native application 420 into the advertised state 424-*a*.

When the user input detector 468 detects a press (e.g., a short press or a long press) of the folder icon 430-*f*, the application launcher 460 displays a window 432 that shows the contents of the folder. The window 432 includes the default state icon 430 and the advertised state icon 430-*a*. The window 432 allows the user to launch the native application 420 into either the default state 424-*d* or the advertised state 424-*a* by pressing the default state icon 430 or the advertised state icon 430-*a*, respectively. Upon detecting a press of the default state icon 430, the application launcher 460 launches the native application 420 into the default state 424-*d*. Similarly, upon detecting a press of the advertised state icon 430-*a*, the application launcher 460 launches the native application 420 into the advertised state 424-*a*. The advertised state icon 430-*a* uses the state access mechanism 428-*a* for the advertised state 424-*a* to launch the native application 420 into the advertised state 424-*a*.

Figure 5:
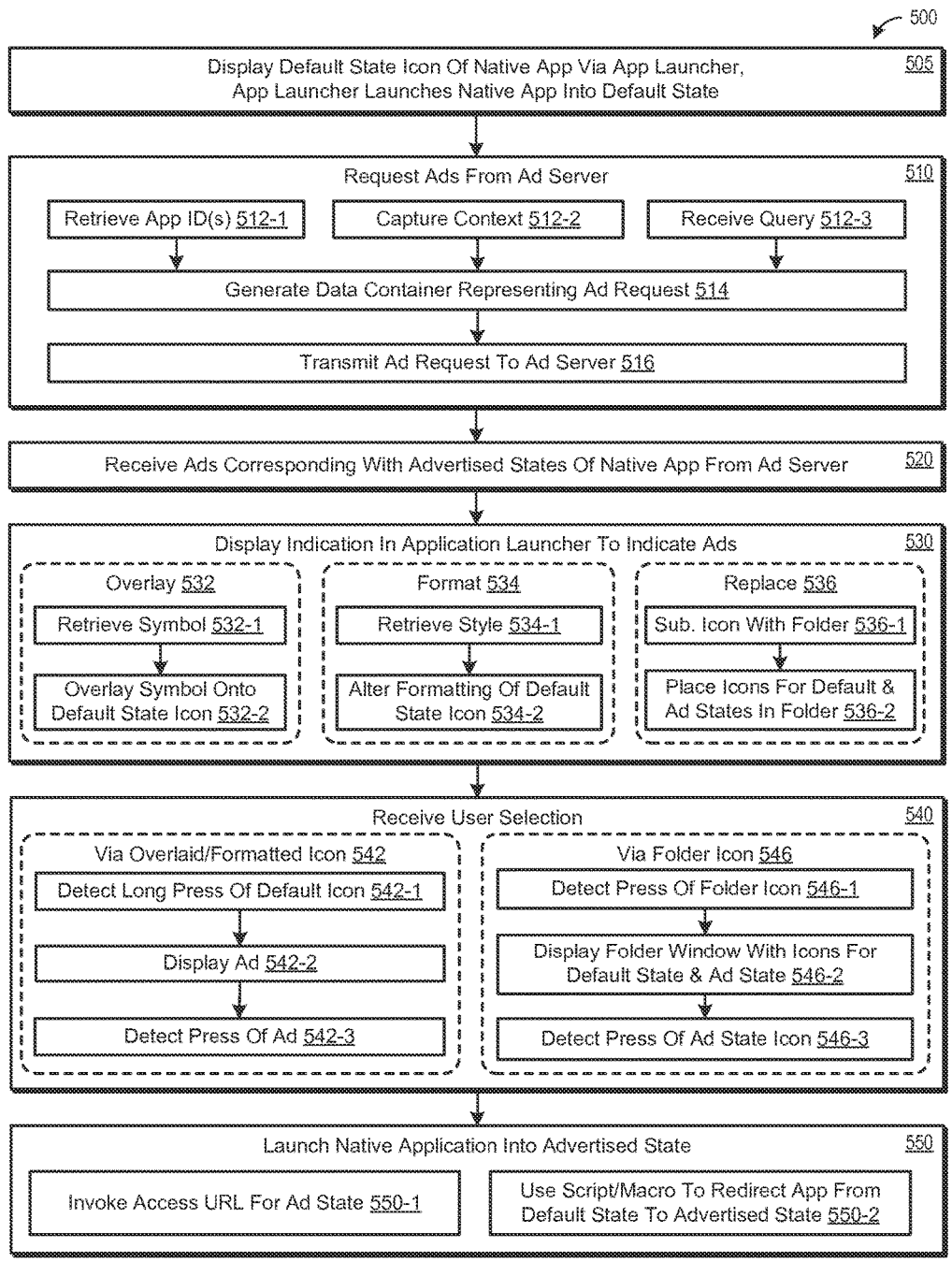
FIG. 5 is a block diagram of an example method that the mobile computing device may use to indicate the advertised states.

FIG. 5 is a block diagram of a method 500 that may be used by a mobile computing device (e.g., the mobile computing device 400 in FIG. 4) to indicate the availability of advertised states. At 505, the mobile computing device displays a default state icon for a native application. The mobile computing device may include an application launcher displays the default state icon on a home screen. The home screen may be configured according to the user's preferences (e.g., the user selects which icons are displayed in the home screen(s)). The application launcher launches the native application into a default state upon detecting a user selection (e.g., a press) of the default state icon. The application launcher may display other default state icons for other native applications on the home screen.

At 510, the mobile computing device (e.g., the application launcher) requests ads from an ad server. The mobile computing device may request the ads by sending an ad request. The ad request includes application IDs of native applications installed at the mobile computing device. Additionally, the ad request may include contextual data that indicates a context of the mobile computing device. Additionally or alternatively, the ad request may also include a search query.

At 512, the mobile computing device obtains data used to request the ads from the ad server. As previously discussed, the data used to request the ads can include application IDs, context data, and/or a search query. At 512-1, the mobile computing device retrieves the application IDs of native applications installed at the mobile computing device. The mobile computing device may retrieve the application IDs from a memory that stores the native applications. Additionally, the mobile computing device may capture contextual data at 512-2. Capturing the contextual data may include recording sensor measurements using sensors or retrieving the sensor measurements stored in the memory. For example, capturing the contextual data may include recording a location of the mobile computing device using a GPS sensor. Capturing the contextual data may include retrieving a search history that includes searches made by the mobile computing device within a particular time period (e.g., within the last 7 days). Capturing the contextual data may also include fetching application usage data that indicates which native applications were used previously (e.g., in the last 5 minutes).

The mobile computing device may receive a search query at 512-3. The mobile computing device may receive the search query from a user of the mobile computing device. For example, the user may enter the search query in a search box that is displayed by the application launcher on the home screen. The mobile computing device may include the search query in the ad request in addition to the application IDs.

At 514, the mobile computing device generates (e.g., instantiates) a data container that represents the ad request. The data container may be a JSON file, an XML file, or any other suitable data object that can be used to transport data. The ad request includes the application IDs retrieved at 512-1. Additionally, the ad request may include the contextual data captured at 512-2 and/or the search query received at 512-3.

At 516, the mobile computing device transmits the ad request to an ad server. The mobile computing device transmits the ad request via a transceiver of the mobile computing device. The mobile computing device may transmit the ad request periodically. Alternatively or additionally, the mobile computing device may transmit the ad request in response to detecting a trigger. For example, the mobile computing device may transmit the ad request in response to the mobile computing device displaying the home screen. The mobile computing device may transmit the ad request in response to the mobile computing device receiving the search query.

At 520, the mobile computing device receives ads from the ad server. The mobile computing device may receive the ads in response to transmitting the ad request to the ad server. Alternatively, the mobile computing device may receive the ads irrespective of the ad request. The mobile computing device may receive the ads in a data container representing an ad object (e.g., a JSON file, an XML file, etc.). The ad object may include information related to the ads. For example, an ad object may identify a native application (e.g., via an application ID) with which the ad is associated. The ad object may also identify an advertised state by indicating a particular state within the native application. For example, the ad object may include a state identifier. The ad object may include a state access mechanism (e.g., an access URL, a script or a macro) that provides direct access to the advertised state. In some implementations, the state identifier is the state access mechanism. The ad may include an ad preview that may include some information displayed by the advertised state.

At 530, the mobile computing device displays an indication in the application launcher to indicate the availability of the ads. The mobile computing device displays the indication in association with the default state icons of native applications that include the advertised states. The mobile computing device may display the indication by overlaying a symbol on the default state icon at 532. Alternatively, the mobile computing device may display the indication by formatting the default state icon at 534. Alternatively, the mobile computing device may replace the default state icon with a folder icon at 536.

Referring to 532, the application launcher retrieves a symbol from the memory at 532-1. The symbol may be an object (e.g., a circle, a triangle, a square or any geometric shape). Alternatively, the symbol may include text (e.g., "Ads", "HOLD for Ads", etc.). The symbol can also include an image. If there are application-specific symbols, the application launcher retrieves the symbol corresponding with the native application identified by the ad. For example, the application launcher may utilize an inverted index that indexes the native applications IDs to the symbols. Specifically, the application launcher can query the inverted index with an application ID and receive a pointer that points to a memory location where the symbol is stored.

At 532-2, the application launcher overlays the symbol onto the default state icon. The application launcher may place the symbol towards a corner of the default state icon, so that the default state icon is still recognizable. The application launcher may adjust a size of the symbol, so that symbol does not conceal a substantial portion of the default state icon. For example, the application launcher may reduce the size of the symbol to less than twenty-five percent of the size of the default state icon. The application launcher may also adjust a transparency level of the symbol, so that the symbol does not conceal the default state icon.

Referring to 534, the application launcher retrieves a formatting style from the memory at 534-1. The formatting style indicates visual characteristics that can be applied to a default state icon. For example, the formatting style may indicate a thickness for a border surrounding the default state icon. The formatting style may indicate a font (e.g., font size, font color or font type) for a caption displayed by the default state icon. The formatting style may indicate a refresh rate for the default state icon. For example, the formatting style may indicate a refresh rate that is slower than a default refresh rate in order to give the default state icon a flashing appearance. The formatting style may include other visual characteristics that can be used to make the default state icon appear different.

The memory may store multiple formatting styles. For example, there may be different formatting styles for different native applications. If there are application-specific formatting styles, the application launcher retrieves the formatting style that corresponds with the native application identified by the ad. For example, the application launcher may utilize an inverted index that indexes the native applications IDs to the formatting styles.

At 534-2, the application launcher uses the formatting style to alter the appearance of the default state icon for the native application indicated by the ad. The application launcher may apply all the visual characteristics specified by the formatting style to the default state icon. Alternatively, the application launcher may apply the visual characteristics selectively. For example, the application launcher may only apply the visual characteristics that correspond with a current theme. Alternatively, the application launcher may only apply visual characteristics that do not correspond with the current theme in order to emphasize the difference between the default state icon and other icons.

Referring to 536, the application launcher may replace the default state icon for a native application identified by an ad with a folder icon that corresponds with a folder (at 536-1). The application launcher can move the default state icon into the folder. Furthermore, the application launcher can place the advertised state icon(s) in the folder (at 536-2). The default state icon provides access to the default state and the advertised state icon(s) provide access to the advertised states of the native application. The application launcher may use the state access mechanism(s) included in the ad to generate the advertised state icon(s). The folder icon may appear similar to the default state icon. For example, the folder icon may have the same icon image and the same icon caption as the default state icon. But the folder icon can include an extra visual feature to indicate that pressing the folder icon opens a folder. For example, the folder icon may include a circle that surrounds most of the folder icon.

At 540, the mobile computing device receives a user input to launch the native application into the advertised state. The mobile computing device may receive the user input in different ways based on how the application launcher indicates the availability of the advertised states. For example, if the application launcher indicates the ads by displaying an indication in association with the default state icon at 532 or 534, then the application launcher may receive the user selection as exemplified in block 542. Alternatively, if the application launcher indicates the ads by replacing the default state icon with the folder icon at 536, then the application launcher may receive the user selection as exemplified in block 546.

Referring to 542, the mobile computing device can detect a press-and-hold of the default state icon at 542-1. The mobile computing device may detect the press-and-hold when a physical object makes contact with the touchscreen display for a time duration that is longer than a threshold amount of time (e.g., 500 ms or 1 s). The press-and-hold may be referred to as a long press.

Upon detecting a long press of the default state icon, the application launcher can display the ad(s) for the advertised state(s) at 542-2. The application launcher may display the ad(s) by displaying the state access mechanism(s) for the advertised state(s) adjacent to the default state icon. Alternatively, the application launcher may display an ad preview for the advertised state. The ad preview may be linked with the state access mechanism for the advertised state, so that pressing the ad preview launches the native application into the advertised state. At 542-3, the application launcher detects a press of the ad (e.g., a press of the state access mechanism for the advertised state or a press of the ad preview).

Referring to 546, the mobile computing device can detect a press of the folder icon at 546-1. The mobile computing device may detect the press when a physical object makes contact with the touchscreen display for a time duration that is less than the threshold amount of time (e.g., less than 500 ms). Upon detecting a press of the folder icon, the application launcher displays a window that shows the contents of the folder (at 546-2). The window displays the default state icon that was replaced with the folder icon. Additionally, the window displays the advertised state icon for the advertised state. At 546-3, the application launcher detects a press of the advertised state icon to launch the native application into the advertised state.

At 550, the application launcher launches the native application into the advertised state. The application launcher can launch the native application by retrieving a set of computer-readable instructions that correspond with the native application and instruct an operating system of the mobile computing device to execute the computer-readable instructions. The application launcher can use the state access mechanism included in the ad to launch the native application into the advertised state. If the ad includes a state ID for the advertised state instead of the state access mechanism, then the application launcher can retrieve the state access mechanism from the memory. For example, the application launcher may utilize an inverted index that indexes the state IDs to the state access mechanisms.

The state access mechanism may include a URL that points to the advertised state. The URL may be referred to as an application URL or an access URL. Alternatively, the state access mechanism may include a script (e.g., a macro) that automatically redirects the native application from the default state to the advertised state. The application launcher utilizes the state access mechanism to launch the native application directly into the advertised state. For example, the application launcher can invoke the URL to launch the native application directly into the advertised state (at 550-1). Alternatively, the application launcher can launch the native application in the default state and use the script to redirect the native application from the default state to the advertised state (at 550-2).

Figure 6:
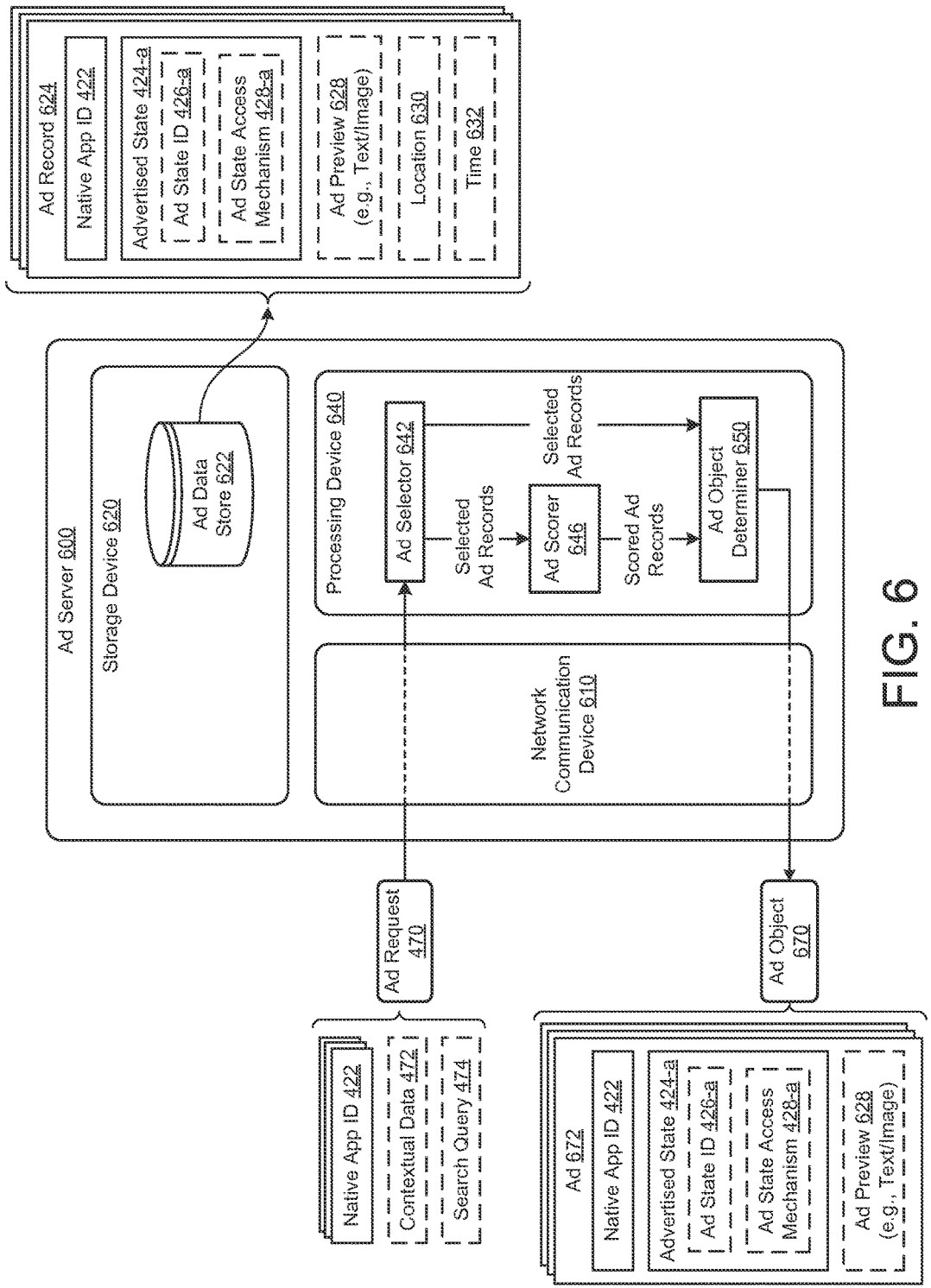
FIG. 6 is a block diagram of an example advertisement server that determines advertisements that correspond with states of native applications installed at the mobile computing device.

FIG. 6 is an example block diagram of the ad server 600. The ad server 600 receives an ad request 470 (e.g., from the mobile computing device 400 in FIG. 4) and provides an ad object 670 that includes ads 672 in response to the ad request 470. The ad server 600 may include a network communication device 610, a storage device 620 and a processing device 640. The ad server 600 may be implemented by a cloud computing platform. The cloud computing platform may include a collection of remote computing services. The cloud computing platform may include computing resources (e.g., processing device 640). The computing resources may include servers (e.g., physical servers or virtual servers). The cloud computing resources may include storage resources (e.g., storage device 620). The storage resources may include database servers that support NoSQL, MySQL, Oracle, SQL Server, or the like. The cloud computing platform may include networking resources (e.g., network communication device 610). For example, the networking resources may distribute incoming requests for event notifications across multiple virtual private servers. Example cloud computing platforms include Amazon Web Services®, Google Cloud Platform®, Microsoft AZURE™ and Alibaba Aliyun™.

The network communication device 610 communicates with a network (e.g., the network 310 shown in FIG. 3). The network communication device 610 may include a communication interface that performs wired communication (e.g., via Ethernet, Universal Serial Bus (USB) or fiber-optic cables). The network communication device 610 may perform wireless communication (e.g., via Wi-Fi, Bluetooth, Bluetooth Low Energy (BLE), NFC, ZigBee, a cellular network, or satellites). The network communication device 610 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 620 stores data. The storage device 620 may include one or more computer readable storage mediums. For example, the storage device 620 may include solid state memory devices, hard disk memory devices, optical disk drives, read-only memory and/or nanotube-based storage devices. The storage device 620 may be connected to the processing device 640 via a bus and/or a network. Different storage mediums within the storage device 620 may be located at the same physical location (e.g., in the same data center, same rack, or same housing). Different storage mediums of the storage device 620 may be distributed (e.g., in different data centers, different racks, or different housings). The storage device 620 may implement (e.g., store) an ad data store 622.

The ad data store 622 stores ad records 624 that correspond with the ads 672. An ad record 624 corresponds with an advertised state 424-*a* of a native application. The ad record 624 may indicate the native application by including the native application ID 422. The ad record 624 may indicate the advertised state 424-*a* by including the state ID 426-*a* for the advertised state 424-*a*. The state ID 426-*a* for the advertised state 424-*a* may be referred to as the advertised state ID 426-*a*. Alternatively, the ad record 624 may indicate the advertised state 424-*a* by including the state access mechanism 428-*a* for the advertised state 424-*a*. The state access mechanism 428-*a* for the advertised state 424-*a* may be referred to as the advertised state access mechanism 428-*a*. The advertised state access mechanism 428-*a* provides access to the advertised state 424-*a*. The advertised state access mechanism 428-*a* can include a URL (e.g., a Uniform Resource Identifier (URI)) that points directly to the advertised state 424-*a*. Alternatively, the advertised state access mechanism 424-*a* can include a script (e.g., a macro) that automatically redirects the native application from the default state to the advertised state 424-*a*. The advertised state access mechanism 428-*a* may use other suitable techniques to provide access to the advertised state 424-*a*.

The ad record 624 may include an ad preview 628. The ad preview 628 can provide a preview of the advertised state 424-*a*. For example, the ad preview 628 may include certain information from the advertised state 424-*a*. The ad record 624 may include a location 630 that is associated with the ad record 624. The location 630 may indicate a geographic area where the ad 672 corresponding with the ad record 624 may be relevant. The ad record 624 may include a time 632 that indicates a specific time or a time duration during which the ad 672 corresponding with the ad record 624 may be relevant. The ad data store 622 may include one or more databases, indices (e.g., inverted indices), tables, Look-Up Tables (LUT), files, or other data structures.

The processing device 640 may include a collection of one or more computing processors that execute computer readable instructions. The computing processors of the processing device 640 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 640 may execute computer-readable instructions corresponding with an ad selector 642, an ad scorer 646 and an ad object determiner 650.

The ad selector 642 selects the ad records 624 from the ad data store 622 based on the ad request 470. The ad selector 642 may select ad records 624 that correspond with the native application IDs 422 specified in the ad request 470 (e.g., the native applications installed at the mobile computing device 400 in FIG. 4). The ad selector 642 may utilize an inverted index that indexes the native application IDs 422 to the ad records 624. The ad selector 642 may use other information included in the ad request 470 to select the ad records 624. For example, the ad selector 642 may select the ad records 624 based on the contextual data 472 and/or the search query 474 included in the ad request 470.

The ad selector 642 may select ad records 624 based on the data included in the ad request 470. For example, the ad selector 642 may select the ad records 624 based on a location of the mobile computing device that sent the ad request 470. The ad selector 642 may determine the location of the mobile computing device by retrieving the location from the ad request 470, for example, if the contextual data 472 includes the location. Alternatively, the ad selector 642 may determine the location of the mobile computing device by retrieving the location from a network node (e.g., a Home Location Register (HLR)). The ad selector 642 may select ad records 624 that are relevant to the location of the mobile computing device by using the location as a constraint in a constraint-based search. Alternatively, the ad selector 642 may utilize an inverted index that indexes the locations 630 to the ad records 624. For example, the ad selector 642 may compare the location of the mobile computing device with the locations 630 in the inverted index.

Similarly, the ad selector 642 may use a current time in the time zone of the mobile computing device to select the ad records 624. The ad selector 642 may utilize an inverted index that indexes the times 632 to the ad records 624. Alternatively, the ad selector 642 may use constraint-based searches, for example, by searching for ad records 624 that satisfy the time constraints indicated by the contextual data 472. The ad selector 642 may use a combination of the location and time to select the ad records 624. For example, if the ad request 470 indicates that the mobile computing device 400 is moving and is within 3 blocks of a Glo Pizza store between 11:45 am and 12:45 pm on Monday through Friday, the ad selector 642 can select the ad record 624 corresponding with Glo Pizza. The ad selector 642 may use any other suitable techniques for selecting the ad records 624 (e.g., entity bidding, targeted advertising based on subscription tags, etc.).

The ad scorer 646 may score the selected ad records to determine a relevance score for each of the selected ad records. The ad scorer 646 may utilize various scoring features in scoring the selected ad records. For example, the ad scorer 646 may use location as a scoring feature. Ad records 624 that are associated with a location 630 that is closer to the mobile computing device may receive a higher score than ad records with a location 630 that is farther from the mobile computing device. Similarly, the ad scorer 646 may use time as a scoring feature. Ad records 624 that are associated with a time 632 that is closer to the current time at the mobile computing device may receive a higher score than the ad records 624 with a time 632 that is farther from the current time of the mobile computing device. The ad scorer 646 may use any other suitable scoring features to score the selected ad records.

The ad object determiner 650 generates a data container that represents the ad object 670. The ad object determiner 650 retrieves information for the selected ad records from the ad data store 622 and includes the information in the ad object 670. The ad object determiner 650 may include information from all the selected ad records in the ad object 670. Alternatively, the ad object determiner 650 may include information for the highest scoring ad records in the ad object 670. For example, the ad object determiner 650 may include information for the ad records 624 that scored above a score threshold. For each ad 672, the ad object determiner 650 include the native application ID 422. The ad object determiner 650 can include the advertised state ID 426-*a* and/or the advertised state access mechanism 428-*a* to indicate the advertised state 424-*a*. Additionally, the ad object determiner 650 can include the ad preview 628. The ad object determiner 650 uses the network communication device 610 to transmit the ad object 670 to the mobile computing device.

Although FIG. 6 discloses example techniques that the ad server 600 may use to select the ads 672, the ad server 600 may use other techniques for selecting the ads 672. Other example techniques for the ad server 600 to select the ads 672 are disclosed in U.S. patent application Ser. Nos. 14/259,873, 14/575,615, 14/575,485, 14/810,160 and 14/831,512, which are incorporated by reference herein in their entireties. Similarly, while FIG. 5 illustrates example techniques for indicating advertised states of an application and launching the application into the advertised states, other techniques can also be used to indicate the advertised state and launch the application into the advertised state. For example, other techniques for indicating advertised states of an application and launching the application into the advertised states are disclosed in U.S. patent application Ser. No. 14/831,512, which is incorporated by reference herein in its entirety.

In some implementations, the application launcher displays a first icon for a first state of an application and a second icon for a second state of the application. For example, the application launcher may a default icon for a default state of an application and an advertised icon for an advertised state of the application. In such implementations, the application launcher launches the application into the default state upon detecting a user selection of the default icon. Similarly, the application launcher can launch the application into the advertised state upon detecting a user selection of the advertised icon.

In some implementations, the mobile computing device receives the ad object without explicitly transmitting an ad request. For example, the mobile computing device may receive the ad object as a push message. The mobile computing device can receive the ad objects periodically. For example, the mobile computing device may receive an object daily, weekly, etc. The mobile computing device can specify the frequency at which the mobile computing device receives the ad object. For example, the mobile computing device may reduce the frequency from daily to once a month. Similarly, the mobile computing device may increase the frequency from daily to once every hour.

In some implementations, the mobile computing device stores a list of advertised states. The application launcher can display the advertised states stored in the list instead of requesting ads from an ad server. The list of advertised states may be loaded onto the mobile computing device when the operating system is installed on the mobile computing device. The mobile computing device can append advertised states to the list. For example, when the mobile computing device receives an ad object that specifies additional advertised states, the mobile computing device can append the advertised state specified in the ad object to the list. The mobile computing device can also purge advertised states from the list. For example, if the mobile computing device receives a user selection to not display a particular advertised state, the mobile computing device can purge the entry corresponding with that particular advertised state from the list.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A mobile computing device comprising:
a transceiver;
a touchscreen display;
a sensor;
a memory configured to store a native application installed on the mobile computing device and an application launcher configured to launch the native application; and
a computing processor configured to execute computer-readable instructions that, when executed by the computing processor, cause the computing processor to:
display an icon corresponding with the native application via the application launcher,
in response to the displaying of the icon, transmit an advertisement request via the transceiver, wherein the advertisement request includes an application identifier (ID) that identifies the native application,
receive a plurality of advertisement objects in response to the transmitting of the advertisement request, wherein each advertisement object of the plurality of advertisement objects includes an application access mechanism that is used to access an advertised state of the native application that corresponds to an advertisement,
in response to the receiving of the plurality of advertisement objects, display an indication in association with the icon, wherein the indication indicates that the advertised state of the native application can be accessed by receiving a gesture input on the icon via the touchscreen display,
in response to receiving a first user selection that includes a first type gesture input on the icon via the touchscreen display, launch the native application into a default state, and
in response to receiving a second user selection that includes a second type gesture input on the icon via the touchscreen display:
select a subset of the plurality of advertisement objects,
display a list of advertisements corresponding to the subset of the plurality of advertisement objects adjacent to the icon, and
in response to receiving a third user selection that includes a third type gesture input on a first advertisement of the list of advertisements via the touchscreen display, launch the native application into a first advertised state corresponding to the first advertisement using a first application access mechanism,
wherein the first application access mechanism includes a uniform resource identifier (URI) or a script which is used to access the first advertised state of the native application that corresponds to the first advertisement.

2. The mobile computing device of claim 1, wherein the transmitting of the advertisement request comprises:
capturing contextual data that indicates a context of the mobile computing device or receiving a search query via a search box displayed by the application launcher, and
generating a data container to transport the contextual data or the search query.

3. The mobile computing device of claim 2, wherein the capturing of the contextual data comprises:
retrieving sensor measurements taken by the sensor,
retrieving a search history comprising previous search queries,
retrieving application IDs of native applications installed at the mobile computing device,
retrieving application IDs of native applications that the mobile computing device is currently executing, or
retrieving information that the touchscreen display is currently displaying.

4. The mobile computing device of claim 1, wherein the URI provides direct access to the first advertised state, and the script redirects the native application from the default state to the first advertised state.

5. The mobile computing device of claim 1, wherein the displaying of the indication comprises:
retrieving a symbol from the memory, and
overlaying the symbol onto the icon.

6. The mobile computing device of claim 5, wherein the symbol comprises at least one of a text string or an image.

7. The mobile computing device of claim 1, wherein the displaying of the indication comprises:
altering a formatting of the icon, and
rendering the formatted icon.

8. The mobile computing device of claim 7, wherein the altering of the formatting of the icon comprises at least one of:
   thickening a border that surrounds the icon,
   changing a color of the icon,
   changing a refresh rate of the icon,
   changing a font of the icon, or
   increasing a size of the icon.

9. The mobile computing device of claim 1, wherein the launching of the native application into the advertised state comprises invoking the application access mechanism.

10. The mobile computing device of claim 1, wherein the launching of the native application into the advertised state comprises:
   launching the native application into the default state, and
   using a script to automatically redirect the native application from the default state to the advertised state.

11. The mobile computing device of claim 10, wherein the advertisement comprises a plurality of advertisements, each advertisement corresponding with a different advertised state.

12. A mobile computing device comprising:
   a transceiver;
   a touchscreen display;
   a memory configured to store a native application installed on the mobile computing device and an application launcher configured to launch the native application; and
   a computing processor configured to execute computer-readable instructions that, when executed by the computing processor, cause the computing processor to:
      display an icon corresponding with a default state of the native application,
      in response to the displaying of the icon, transmit an advertisement request via the transceiver, wherein the advertisement request includes an application identifier (ID) that identifies the native application,
      receive a plurality of advertisement objects in response to the transmitting of the advertisement request, wherein each advertisement object of the plurality of advertisement objects includes an application access mechanism that is used to access an advertised state of the native application that corresponds to an advertisement,
      in response to the receiving of the plurality of advertisement objects, replace the icon with a folder icon corresponding with a folder, wherein the folder includes the icon, and
      in response to receiving a first user selection of the folder icon via the touchscreen display:
         select a subset of the plurality of advertisement objects,
         display a subset of advertisements corresponding to the subset of the plurality of advertisement objects in a window corresponding to the folder including the icon,
         in response to receiving a second user selection of the icon via the touchscreen display, launch the native application into the default state, and
         in response to receiving a third user selection of one of the subset of advertisements using the touchscreen display, launch the native application into the advertised state of the selected one of the subset of advertisements,
   wherein the application access mechanism includes a uniform resource identifier (URI) or a script which is used to access the advertised state of the native application that corresponds to the advertisement.

13. The mobile computing device of claim 12, wherein the transmitting of the advertisement request comprises retrieving the application ID from a data store in the memory.

14. The mobile computing device of claim 12, wherein the replacing of the icon with the folder icon comprises determining the folder icon.

15. The mobile computing device of claim 14, wherein the determining of the folder icon comprises appending an indicator to the icon, the indicator indicating that the default state and the advertised state of the native application can be accessed by pressing the folder icon.

16. A computer-implemented method for launching a native application at a mobile computing device, the computer-implemented method comprising:
   displaying, at a touchscreen display of the mobile computing device, an icon corresponding with the native application via an application launcher being executed by a computing processor of the mobile computing device;
   in response to the displaying of the icon, transmitting an advertisement request via a transceiver of the mobile computing device, wherein the advertisement request includes an application identifier (ID) that identifies the native application;
   receiving, via the transceiver, a plurality of advertisement objects in response to the transmitting of the advertisement request, wherein each advertisement object of the plurality of advertisement objects includes an application access mechanism that is used to access an advertised state of the native application that corresponds to an advertisement;
   in response to the receiving of the plurality of advertisement objects, displaying an indication in association with the icon, wherein the indication indicates that the advertised state of the native application can be accessed by receiving a gesture input on the icon via the touchscreen display;
   in response to receiving a first user selection that includes a first type gesture input on the icon via the touchscreen display, launching the native application into a default state; and
   in response to receiving a second user selection that includes a second type gesture input on the icon via the touchscreen display:
      selecting a subset of the plurality of advertisement objects,
      displaying a list of advertisements corresponding to the subset of the plurality of advertisement objects adjacent to the icon, and
      in response to receiving a third user selection that includes a third type gesture input on a first advertisement of the list of advertisements via the touchscreen display, launching, by the computing processor, the native application into a first advertised state corresponding to the first advertisement using a first application access mechanism,
   wherein the first application access mechanism includes a uniform resource identifier (URI) or a script which is used to access the first advertised state of the native application that corresponds to the first advertisement.

17. The computer-implemented method of claim 16, wherein the transmitting of the advertisement request comprises:

capturing contextual data that indicates a context of the mobile computing device or receiving a search query via a search box displayed by the application launcher; and generating a data container to transport to the contextual data or the search query.

18. The computer-implemented method of claim 16, wherein the advertisement comprises a plurality of advertisements, and wherein the launching of the native application comprises launching the native application into the advertised state corresponding with the selected advertisement.

19. The computer-implemented method of claim 16, wherein the displaying of the indication comprises:

retrieving a symbol from a memory of the mobile computing device; and overlaying the symbol onto the icon.

20. The computer-implemented method of claim 16, wherein the displaying of the indication comprises:

altering a formatting of the icon; and rendering the formatted icon.

21. The computer-implemented method of claim 20, wherein the altering of the formatting of the icon comprises at least one of:

thickening a border that surrounds the icon;

changing a color of the icon;

changing a refresh rate of the icon;

changing a font of the icon; or increasing a size of the icon.

\* \* \* \* \*